(12) United States Patent
Charriere et al.

(10) Patent No.: US 6,944,178 B1
(45) Date of Patent: Sep. 13, 2005

(54) MOBILE TELECOMMUNICATIONS SYSTEMS

(75) Inventors: Patrick Charriere, Tetbury (GB); David Lahiri Bhatoolaul, Grange Park (GB); Qiang Cao, Abbey Meads (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 965 days.

(21) Appl. No.: 09/713,179

(22) Filed: Nov. 15, 2000

(30) Foreign Application Priority Data

Nov. 23, 1999 (EP) .................................. 99309297

(51) Int. Cl.[7] ............................................. H04B 7/212
(52) U.S. Cl. ..................................... 370/444; 370/462
(58) Field of Search ................................ 370/428, 465, 370/535, 537, 350, 503, 466, 467, 401, 229–235, 370/442, 443, 347, 480, 444, 446, 461, 462

(56) References Cited

U.S. PATENT DOCUMENTS 6,434,137 B1 * 8/2002 Anderson et al. ........... 370/347

6,608,835 B2 * 8/2003 Geile et al. ............. 370/395.53

OTHER PUBLICATIONS

"Mac Protocol Specification, TS 25.321, vol. 3.0.0" Jun. 1999, pp. 1-35.
European Search Report, dated Apr. 18, 2000.

* cited by examiner

*Primary Examiner*—Dang Ton (57) ABSTRACT

In the Universal Mobile Telecommunications System, a method of transport format combination selection is provided for directing data units for transmission from a buffer in the RLC layer to transport channels in the MAC layer. The method includes providing a set of information channels in the RLC layer for connection to the buffer and a set of transport channels in the MAC layer for transmission of the data units, selecting a subset of the information channels and a subset of the transport channels for interconnection, and selecting for each transport channel one or more information channels to be multiplexed on the transport channel. A mapping table and a transport block combination table are created as a result of prioritizing the selected transport channels according to a predetermined scheme in dependence on the characteristics of the information channels and then there from, determining the number of data units which may be transmitted in a timing interval.

17 Claims, 7 Drawing Sheets

MOBILE TELECOMMUNICATIONS SYSTEMS

CROSS-REFERENCE TO RELATED APPLICATION

This application claims priority of European Patent Application No. 99309297.2, which was filed on Nov. 23, 1999.

FIELD OF THE INVENTION

This invention relates to mobile telecommunications systems, particularly though not exclusively the Universal Mobile Telecommunications System (UMTS).

DESCRIPTION OF THE RELATED ART

UMTS is defined in various protocols devised by the ETSI project 3GPP™. Generally UMTS consists of four layers, a physical layer, a Medium Access Control Layer (MAC), a Radio Link Control layer (RLC), and a Radio Resource Control layer (RRC). In particular document TS25.321 V.3.0.0 (1999–06) sets out the MAC protocol specification. A particular issue addressed by MAC is the mapping of information channels from the RLC layer to information channels leading to the physical layer. These latter channels are known as Transport Channels. The MAC protocol describes these, as follows:

Common transport channel types are:
  Random Access Channel(s) (RACH)
  Forward Access Channel(s) (FACH)
  Downlink Shared Channel(s) (DSCH)
  DSCH Control Channel
  Common Packet Channel(s) (CPCH) for UL FDD operation only
  Uplink Shared Channel(s) (USCH), for TDD operation only
  ODMA Random Access Channel(s) (ORACH)
  Broadcast Channel (BCH)
  Synchronisation Channel (SCH), for TDD operation only
  Paging Channel (PCH)Dedicated transport channel types are:
  Dedicated Channel (DCH)
  Fast Uplink Signalling Channel (FAUSCH)
  ODMA Dedicated Channel (ODCH)

Figure 1:
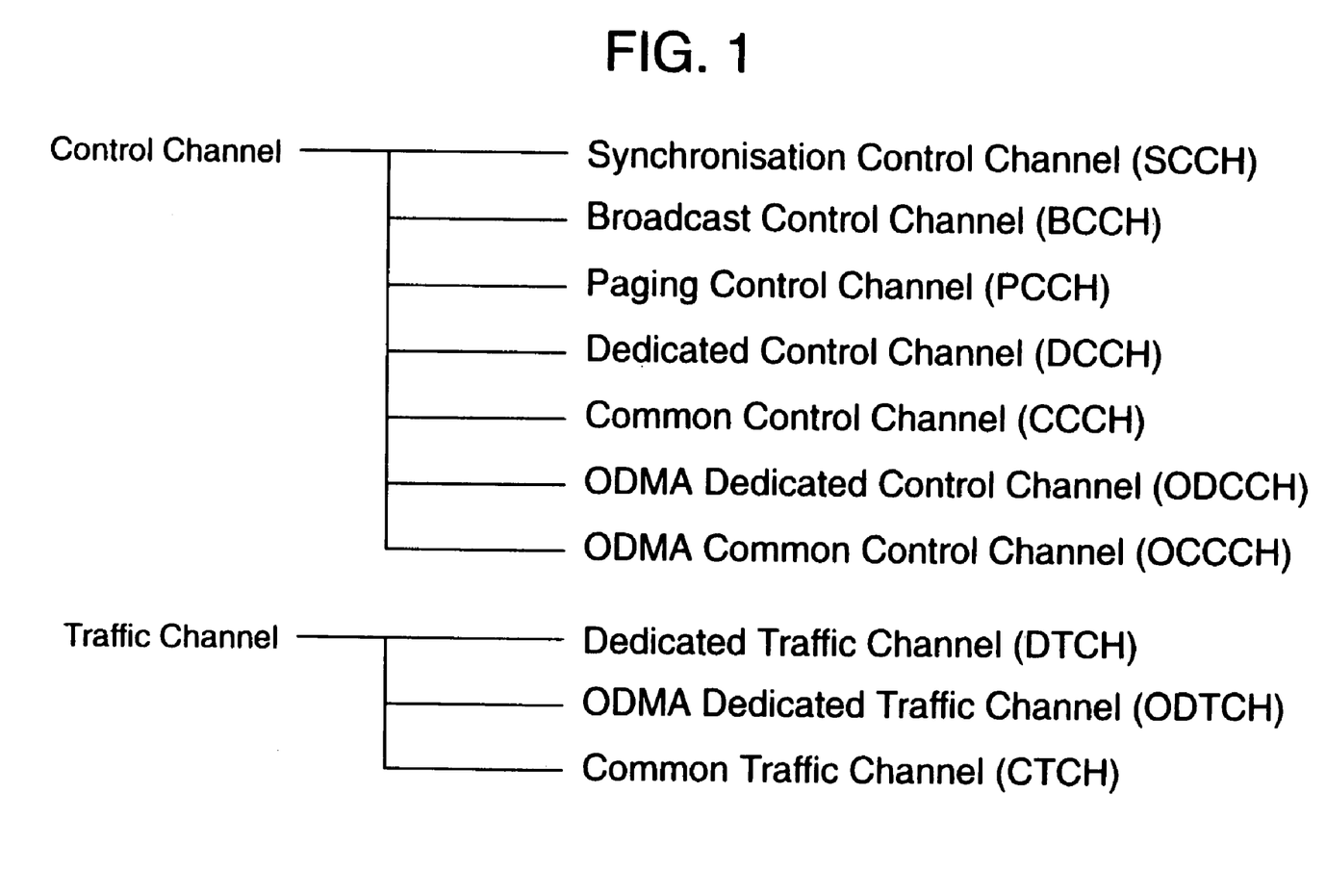
FIG. 1 is a schematic diagram of logical channels for the RLC layer of UMTS.

Information channels leading from RLC to MAC are known as logical channels. Their Structure is shown in FIG. 1 of the accompanying drawings. The mappings of the information channels to their transport channels are pre-defined by the RRC. At any one moment, a combination of logical channels can be mapped to a combination of transport channels. Each transport channel is defined by a Transport Format (for Constant Bit Rate services) or a Transport Format Set (for Variable Bit Rate services) which contains essentially the following information:

1. Transport Block (TB) Size(s)
Transport Block Set (TBS) size(s)
Transmission Time Interval (TTI)

The transport block sizes define all the possible the basic information block size of a transport channel and the transport block set sizes defines all the possible number of such basic information blocks that the transport channel can carry in one Transmission Time Interval. The Transmission Time Interval is the interval over which all the above variables are set, the variables being reset in the next TTI. The characteristics of a combination of transport channels are defined by the Transport Format Combination Set (TFCS). The TFCS contains set of all possible transport format combinations; each transport format combination contains the transport formats of all transport channels that come under one TFCS.

Whilst the MAC protocol specification makes clear that the MAC layer is responsible for the Transport Format Combination Selection, the specification is silent as to the manner in which the MAC layer should do this.

Accordingly, it is an object of the present invention to provide a method and means for implementing Transport Format Combination Selection in the MAC layer of UMTS, being relatively simple, readily implemented, and reliable.

SUMMARY OF THE INVENTION

The present invention provides in a first aspect, in a mobile telecommunications system, a method of directing data units from buffer means to channels for transmission of the data units, the method comprising:
  a. providing a set of information channels for connection to the buffer means, and providing a set of transport channels for transmission of the data units,
  b. selecting a subset of said set of information channels and a subset of said set of transport channels for interconnection, characterised by
  c. electing for each transport channel one or a plurality of information channels to be multiplexed on the transport channel,
  d. prioritising the selected information and/or transport channels according to a predetermined scheme, in dependence on the characteristics of the information channels and/or the data to be transmitted therethrough, and
  e. determining how many data units may be transmitted from the respective buffer means to the transport channels in a timing interval.

The present invention provides in a second aspect, apparatus for directing data units from buffer means to channels for transmission of the data units in a mobile telecommunications system, comprising:
  a set of information channels for connection to the buffer means, and a set of transport channels for transmission of the data units,
  means for selecting a subset of said set of information channels and a subset of said set of transport channels for interconnection, characterised by:
  means for selecting for each transport channel one or a plurality of information channels to be multiplexed on the transport channel,
  means for prioritising the selected information and/or transport channels according to a predetermined scheme; in dependence on their characteristics and/or the data to be transmitted therethrough, and
  means for determining for such logical channels how many data units may be transmitted from the respective buffer means.

Thus in accordance with the invention, a particularly simple yet reliable method and means is provided for connection of data in buffers in the RLC layer of UMTS to transport channels in the MAC layer for transmission, such that the most important data is transmitted first, and a multiple priority scheme is implemented to ensure that the data is appropriately routed into the channels, taking into account the needs of the system equipment.

As preferred, a reference mapping table is formed to relate the transport channels to the information channels and containing the respective buffer status, the number of data units for transmission being determined from the mapping table.

As preferred the method of the invention is carried out for each Transmission Time Interval (TTI), in multiples of 10 msec. For those buffers and information (logical) channels tied to a longer TTI, these will be deselected from the next TTI. Thus, the Transport Format Combination Selection (TFC Selection) selects the appropriate transport format for each transport channel depending on the instantaneous rate. This algorithm resides on the MAC layer.

BRIEF DESCRIPTION OF THE DRAWINGS

A preferred embodiment of the invention will now be described with reference to the accompanying drawings, wherein.

DETAILED DESCRIPTION

Figure 4:
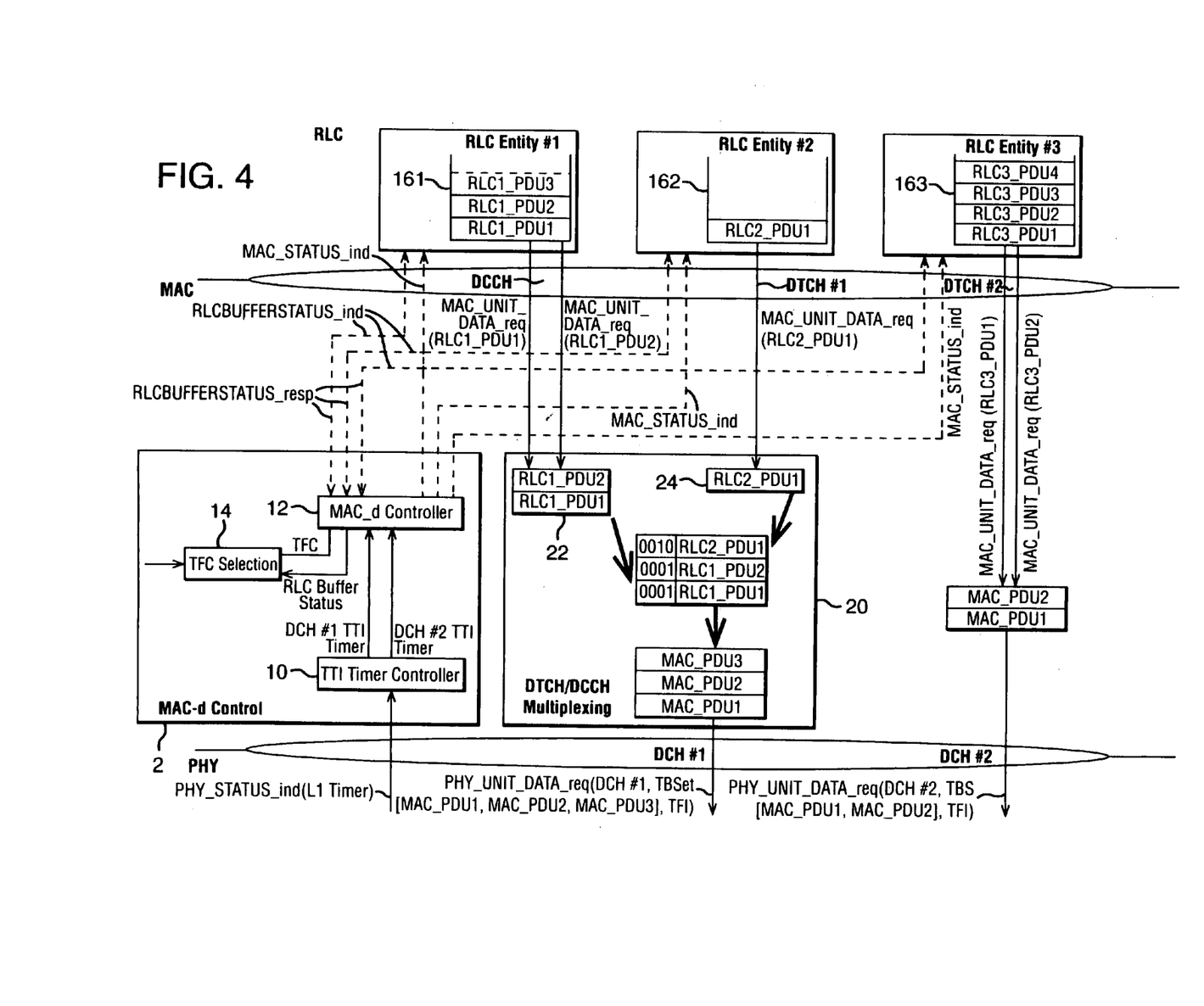
FIG. 4 is a schematic block diagram of the MAC and RLC layers in accordance with the invention.

Referring now to the Drawings, FIG. 4 shows the apparatus according to the invention embodied in a UMTS system comprising a physical layer PHY, a MAC layer, and an RLC layer. A MAC control unit 2, responsible for controlling dedicated transport channels DCH#1, #2, etc in the physical layer comprises a TTI Timer controller unit 10. A timer (not shown) is located in the PHY layer (layer 1), and unit 10 derives the timing intervals for the transport channels. A controller unit 12, and a TFC selection unit 14 are provided. Controller unit 12 transmits and receives control signals of RLC entities #1, #2, #3 etc. in the RLC layer. Each entity has a respective buffer 161, 162, 163 for holding data units (PDU) to be transmitted on the dedicated channels. In the configuration shown in FIG. 4, buffer 161 is coupled to a logical channel DCCH. Buffer 162 is coupled to a logical channel DTCH#1, and the channels are multiplexed together in multiplexer unit 20 onto a single transport channel DCH#1. Two PDUs 22 from channel DCCH are multiplexed onto the channel for a single PDU 24 from channel DTCH#1. Data from buffer 163 is passed directly onto transport channel DCH#2 without multiplexing.

Figure 2:
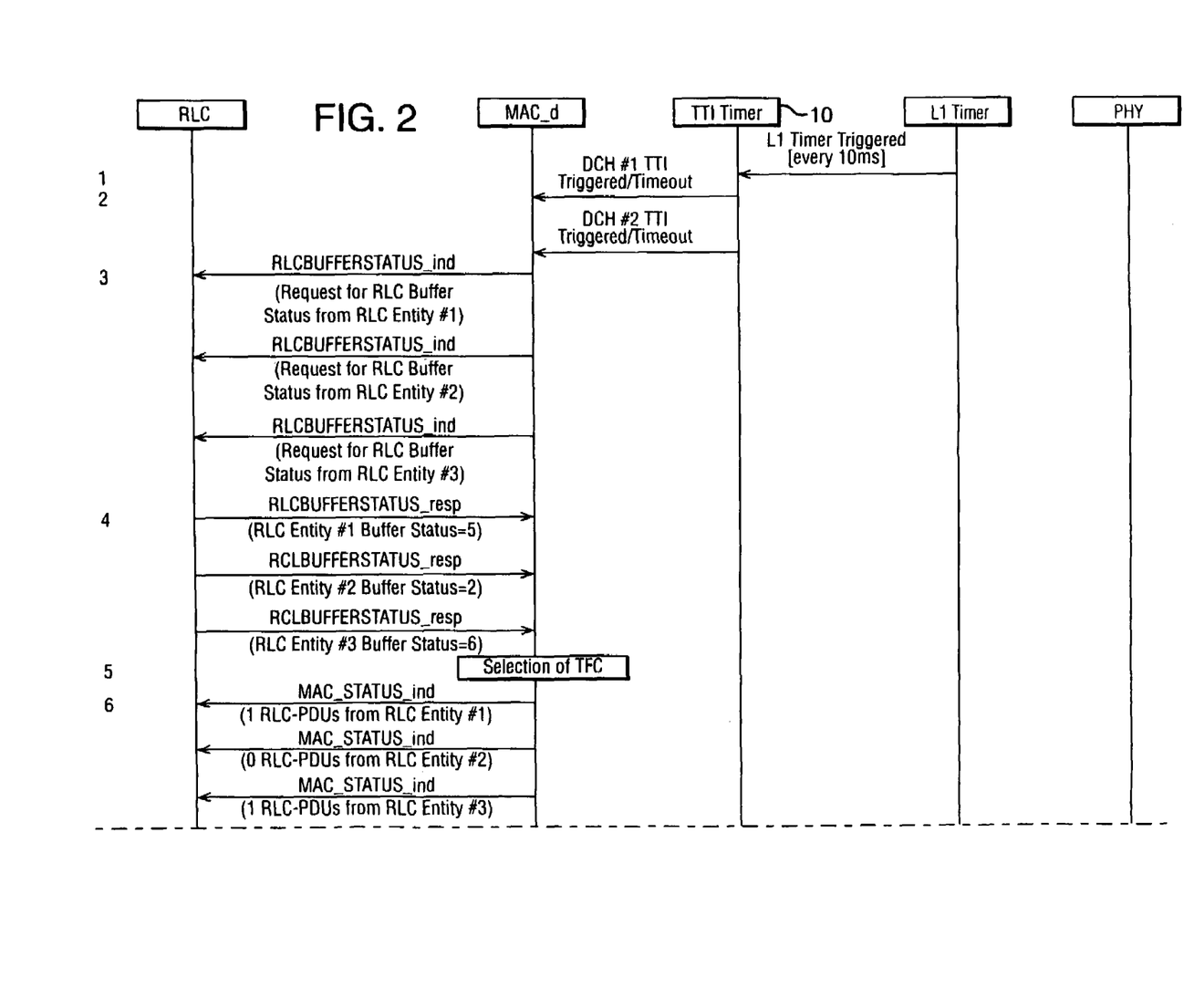
FIG. 2 is a schematic diagram showing flow of control signal and data during the method of the invention.

Referring now to FIG. 2, this shows the flow of control signals and data during the performance of the method of the invention, between physical layer PHY, and MAC and RLC layers. Referring to the numerals at the left hand side of the Figure:

1. The L1 Timer is a Layer 1 timer which is triggered at every 10 ms.
2. In this example, the L1 Timer triggers the respective TTI Timer 10 for DCH #1 and #2. The TTIs for DCH #1 and DCH #2 are 10 ms and 20 ms respectively.
3. This in turn triggers the RLCBUFFERSTATUS_ind to each RLC entity to request the RLC Buffer Status.
4. Each RLC entity responds with its RLC Buffer Status using the RLCBUFFERSTATUS_resp.
5. TFC selection is then performed to produce the closest TFC that fits the RLC Buffer Status for each RLC entity. (See FIG. 3 for the TFC selection algorithm)
6. This TFC result is conveyed to each RLC entity via MAC_STATUS_ind.
7. This triggers each RLC entity to send the amount of RLC-PDUs which is dictated by the TFC result via MAC-d_UNIT_DATA_req.
8. The whole procedure continues in a similar fashion as step 1 to 7. The specific example given below corresponds to steps 8 to 12.

N.B.:

The TFC selection is performed at the minimum TTI (in this case, the TTI Timer for DCH#1, 10 msec).

In the first TFC selection, the TFI (Transport Format Indicator) allowable by the subset TFCS for DCH#1 and DCH#2 needs to be determined.

In the second TFC selection, only the TFI of DCH#1 needs to be determined since the TTI Timer for DCH#2 is not triggered in the current frame. This means that the TFI for DCH#1 is restricted to certain TFCs.

Figure 3:
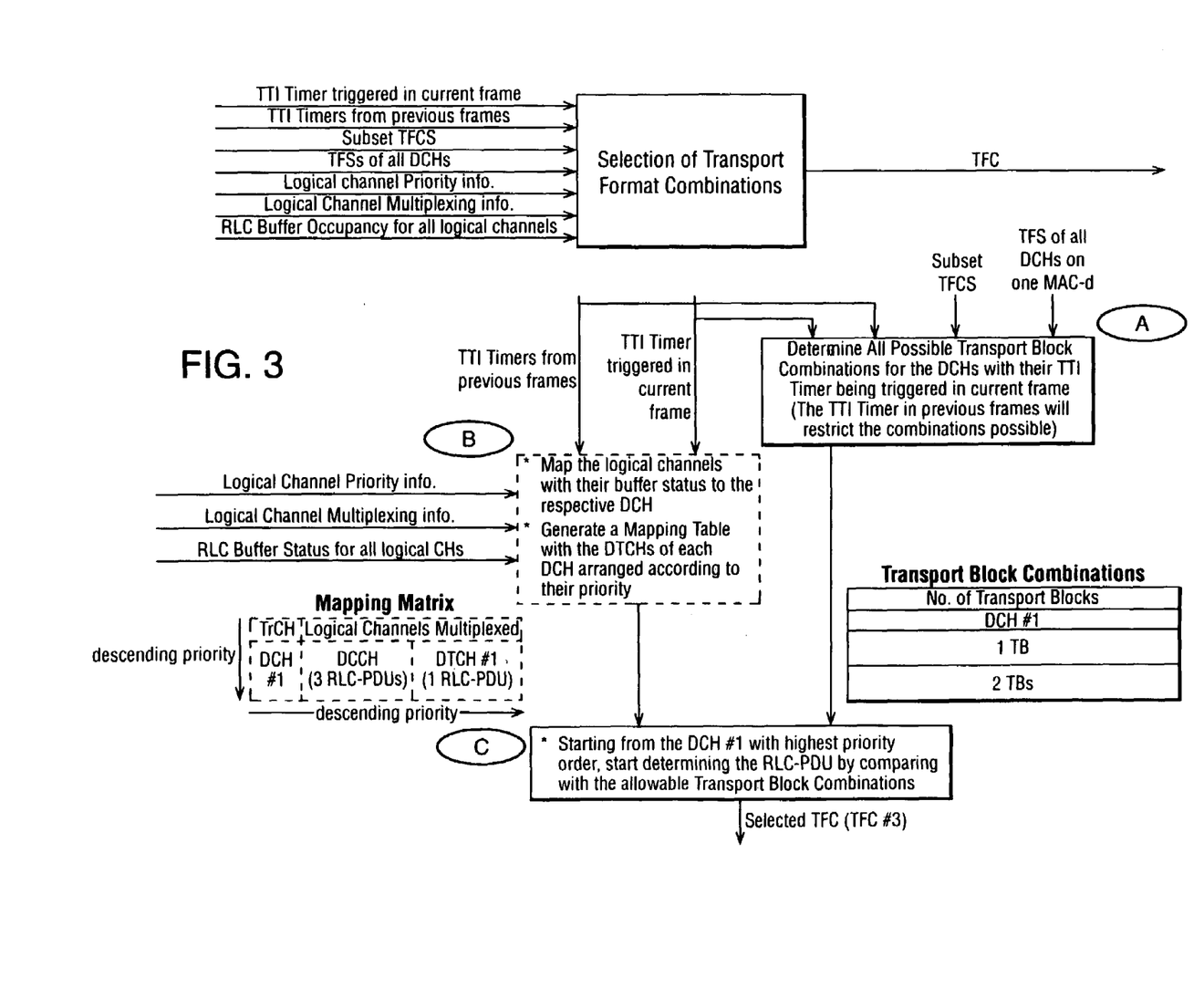
FIG. 3 is a schematic flow diagram of the selection of TFC in accordance with the invention.

Explanation of FIG. 3 (Algorithm)

Referring to the block 30, the inputs to the algorithm include:

TFCS Subset

TFSs (Transport Format Sets) of all DCHs

Logical Channel Multiplexing Info.

Logical Channel Priority Info.

RLC Buffer Status for all Logical Channels

TTI Timers triggered in Current Radio Frame

TTI Timers triggered in Previous Radio Frames that is still Running Output is the Transport Format Combination (TFC).

The algorithm is shown in the flow diagram comprising steps A, B, and C, as follows.

A. Determine all the possible transport block combinations from information in TFCS and the dynamic part of TFS of the DCHs which have their TTI Timers triggered. The DCHs with their TTI Timers still running will not have to select their TFI again (since it has actually been sent to Layer 1 already). However, the TFIs of these DCHs will constrain the possible transport block combinations.

For example, if the subset TFCS

|       | DCH#1(TTI = 10 ms) | DCH#2(TTI = 20 ms) |
|-------|--------------------|--------------------|
| TFC#1 | 0 TB               | 0 TB               |
| TFC#2 | 1 TB               | 1 TB               |
| TFC#3 | 2 TBs              | 1 TB               |

TFC selection is performed at the lowest TTI. In this case, it is 10 ms. In the first TFC selection, TFC#2 (say) has been selected in which DCH#1 can send 1 TB and DCH#2 can send 1 TB. Note that the TTI for DCH#2 is 20 ms. In the second TFC selection, only the TFI of DCH#1 has to be determined. However due to the constraint given by DCH#2 (=1 TB), only TFC#2 and TFC#3 can be selected. Hence the possible Transport Block Combinations are TFC#2 and TFC#3, i.e.

|          | DCH#1(TTI = 10 ms) |
|----------|--------------------|
| TFC#2    | 1 TB               |
| TFC#3    | 2 TBs              |

B. As a result of the information channel multiplexing and priority, a mapping table 32 to relate the DCHs to the DTCHs/DCCH with their RLC buffer status is needed. The mapping table is arranged with each row representing the configuration of a transport channel, the top row being the highest priority transport channel, with lower rows being arranged in order of descending priority. Each row gives the logical or information channels multiplexed onto a transport channel, with the logical channels being arranged in order of descending priority to the right. Assuming that there are two priority status (high or low), the following rules can be applied to create the mapping table:

1. Find the DCH with the most high priority status information channels (DTCHs/DCCH).
2. Arrange the information channel DTCHs/DCCH according to their priority. The order in which the information channel with the same priority is not important.
3. Place the DCH mapping information into the Mapping Table.
4. Place the RLC buffer status as elements of the Mapping Table.
5. Place the next DCH with the next highest high priority status DTCHs/DCCH and go to step 2 until all DCHs that need to select a TFI is completed.

For example, taking the example in A at the second TFC selection and assuming that the DCH#1 contains multiplexing of DTCH#1 (priority: low) and DCCH (priority: high) and the DCH#2 contains only DTCH#2 (priority: low). The RLC buffer status for DTCH# 1, #2 and DCCH is 1, 4, 3 RLC-PDU(s) respectively. DCH# 1 can send 2 TBs, DCH#2 can send 3 TBs. The Mapping Table is:

| DCH#1 | DCCH(3 RLC-PDU) | DTCH#1(1 RLC-PDU) |
|-------|-----------------|-------------------|

At the same time as the mapping table is created, a Transport Block Combination table 34 is created, which gives the number of allowable transport blocks that may be transmitted on each transport channel in each TTI. Although shown in FIG. 3 as a single column, in general the table 34 will be a matrix of row and columns, each column being designated for a different transport channel, and each row corresponding to a TTI.

C. Starting from the DCH with the highest priority, start determining the allowable RLC-PDU which may be transmitted to the transport channel from the highest priority information channel DTCH/DCCH, using the mapping table 32 and Transport Block Combination table 34.

Figure 5:
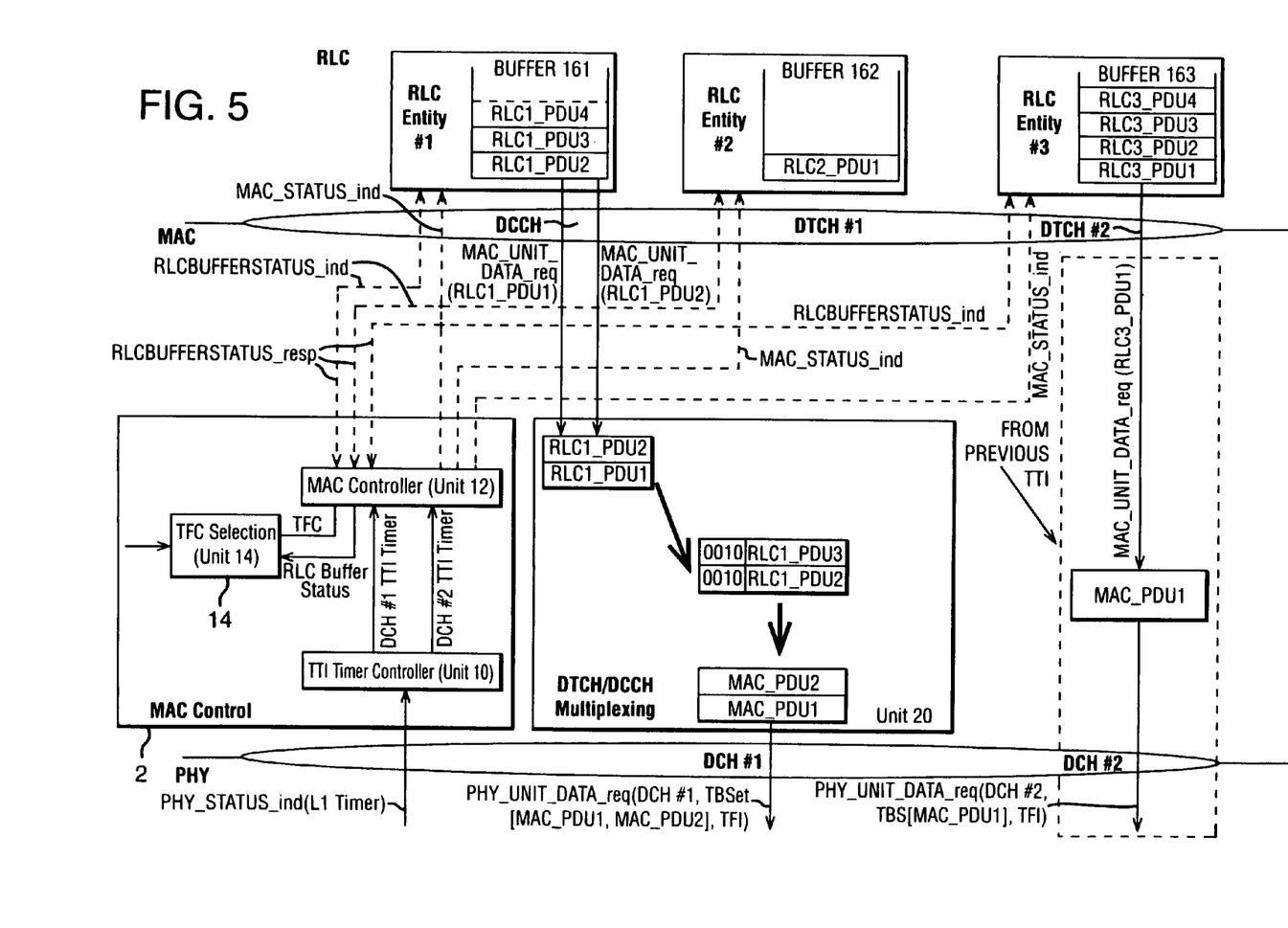
FIG. 5 is a modified view of FIG. 4, conforming to an example given in the text below.

Taking the previous example, TFC#3 is chosen so that DCH#1 can send at least the 2 RLC-PDU for DCCH. This arrangement is shown in FIG. 5.

We claim:

1. In a mobile telecommunications system, a method of directing data units from buffer means to channels for transmission of the data units, the method comprising:

a. providing a set of information channels for connection to the buffer means, and providing a set of transport channels for transmission of the data units,
b. selecting a subset of said set of information channels and a subset of said set of transport channels for interconnection, characterised by:
c. selecting for each transport channel one or a plurality of information channels to be multiplexed on the transport channel,
d. prioritizing the selected information and/or transport channels according to a predetermined scheme, in dependence on the characteristics of the information channels and/or the data to be transmitted therethrough, and
e. determining how many data units may be transmitted from the respective buffer means to the transport channels in a timing interval.

2. A method according to claim 1, in which the mobile telecommunication system is a Universal Mobile Telecommunications System, the buffer means is in a Radio Link Control (RLC) layer, and the transport channels are in a Medium Access Control (MAC) layer, the method including providing a set of information channels in the RLC layer for connection to the buffer means, and providing a set of transport channels in the MAC layer for transmission of the data units.

3. A method according to claim 1 or 2, wherein, in step d, the transport channels are prioritized according to the characteristics of the information channels and/or the data to be transmitted therethrough.

4. A method according to claim 3, wherein, in step d, the transport channels are prioritized according to the characteristics of the information channels.

5. A method according to claim 1, wherein for steps d and e, a reference mapping table is formed to relate the transport channels to the information channels with the elements of the table comprising a respective buffer status.

6. A method according to claim 5, wherein a first row or column of the table contains a highest priority transport channel, and a second row or column a next highest priority channel.

7. A method according to claim 6, wherein for each row or column, the multiplexed information channels are arranged in sequence in order of descending priority.

8. A method according to any of claims 5 to 7, wherein a transport block combination table is formed to relate the number of data units which may be transmitted at each timing interval on each transport channel.

9. A method according to claims 1, 2, 4, 5, 6, or 7, wherein the method is carried out for each consecutive transmission timing interval (TTI).

10. A method according to claim 9, wherein the TTI is the minimum TTI assigned for a transport channel, and those transport channels having assigned a longer TTI are not selected in the next TTI.

11. Apparatus in a mobile telecommunications system for directing data units from buffer means (161–163) to channels (DCH) for transmission of the data units, comprising:

a set of information channels (DTCH, DCCH) for connection to the buffer means, and a set of transport channels (DCH) for transmission of the data units,
means for selecting a subset of said set of information channels and a subset of said set of transport channels for interconnection, characterised by:
means (14) for selecting for each transport channel one or a plurality of information channels to be multiplexed on the transport channel, means for prioritizing the selected information and/or transport channels according to a predetermined scheme; in dependence on their characteristics and/or the data to be transmitted therethrough, and means for determining for such information channels how many data units may be transmitted from the respective buffer means.

12. Apparatus according to claim 11, wherein the prioritizing means is arranged to prioritise the transport channels.

13. Apparatus according to claim 12, wherein the prioritizing means is arranged to prioritise the transport channels in dependence on the characteristics of the information channels.

14. Apparatus according to any of claims 11 to 13, wherein the prioritizing means is arranged to construct a mapping table (32) to relate the transport channels to the information channels with elements of the table being formed by respective buffer status.

15. Apparatus according to claim 14, wherein the prioritizing means is arranged to construct a transport block combination table (34) to relate the number of data units which may be transmitted at each timing interval on each transport channel.

16. Apparatus according to claim 15, wherein the prioritizing means is operative to determine priorities for each consecutive transmission timing interval.

17. Apparatus according to claim 16, wherein the prioritizing means is operative to determine priorities for each minimum transmission timing interval, but excluding those channels which are continuing with a longer transmission interval.

* * * * *